Jan. 29, 1929.
W. W. JOHNSON
1,700,534
ELECTRICAL POWER UNIT
Filed Feb. 12, 1927
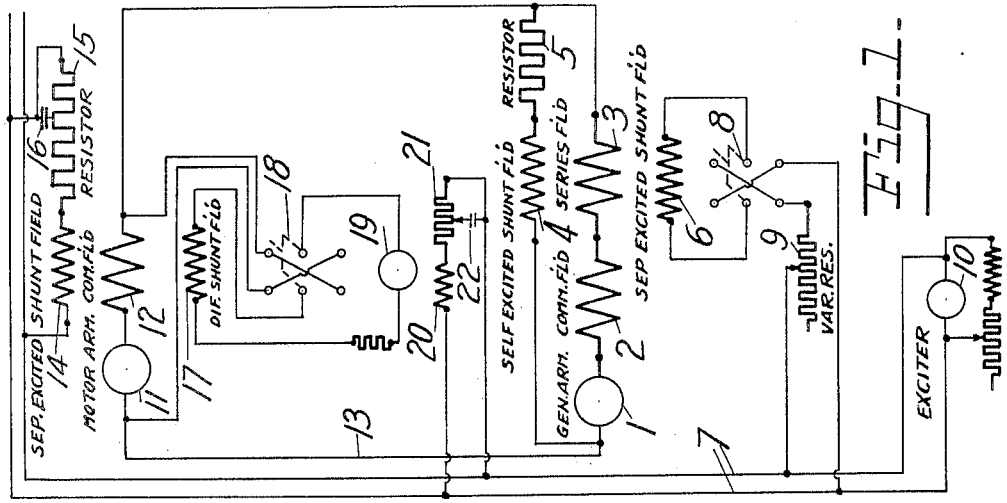
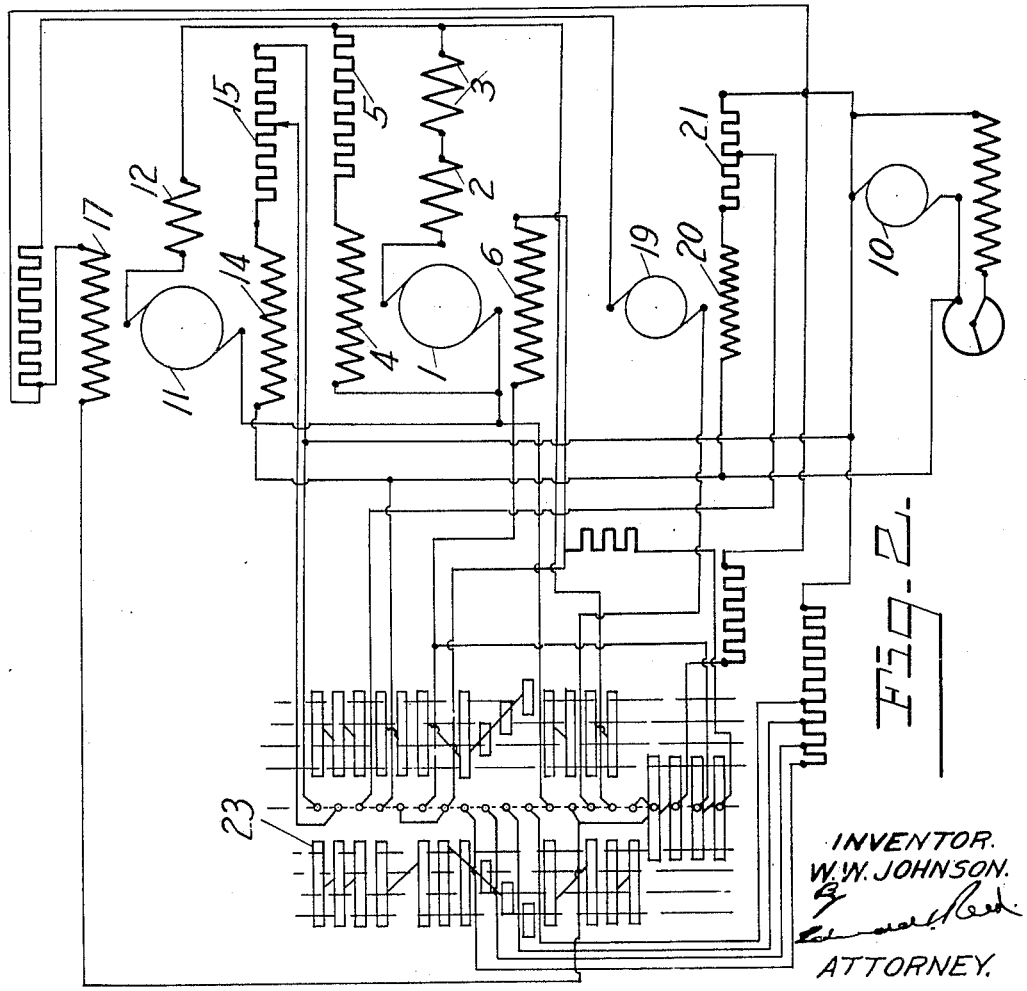
INVENTOR.
W. W. JOHNSON.
ATTORNEY.

Patented Jan. 29, 1929.

1,700,534

UNITED STATES PATENT OFFICE.

WALTER W. JOHNSON, OF MARION, OHIO, ASSIGNOR, BY MESNE ASSIGNMENTS, TO THE MARION STEAM SHOVEL COMPANY, OF MARION, OHIO, A CORPORATION OF OHIO. (1927).

ELECTRICAL POWER UNIT.

Application filed February 12, 1927. Serial No. 167,652.

This invention relates to an electrical power unit and is designed more particularly for use in driving machinery which is subject to wide and sudden variations in current, such as excavating machinery.

The object of the invention is to provide such a power unit having means for automatically changing the inherent speed torque characteristics of a separately excited shunt motor to conform to changing conditions of current and generator voltage, or, in other words, to vary the effective field strength on the motor in accordance with the variations of generator voltage.

Other objects of the invention will appear as it is described in detail.

In the accompanying drawings Fig. 1 is a diagram of an electrical apparatus embodying my invention; and Fig. 2 is a similar diagram showing the several switches embodied in a single controller.

In these drawings I have illustrated one embodiment of my invention and have shown the same as comprising a differentially compound wound generator of such a character as to have a high no load voltage which is inherently reduced to practically zero when the generator is delivering maximum current. Connected with this generator is a motor having a separately excited shunt field and having means differential to the shunt field and controlled in accordance with the generator voltage to vary the effective field strength of the separately excited shunt field of the motor, thereby enabling the motor to operate at maximum speed on a light load and to develop its maximum torque under heavy load. In the particular embodiment of the invention here shown, the generator comprises an armature 1 having a commutating field 2 and a series field 3. The generator also has a self-excited shunt field 4 connected across the generator armature, commutating field and series field and provided with a resistor 5. The generator also has a separately excited shunt field 6 which is connected in a main exciter circuit 7. The connection of the separately exited shunt field with the exciter circuit is controlled by a reversing switch 8. This shunt field is also provided with a variable resistor 9. An exciter 10 is connected in the main exciter circuit and may be operated from any suitable source of power, such as direct connection to the main generator or individual motor.

A shunt motor is directly connected with the generator and this motor is here shown as comprising an armature 11 having a commutating field 12. The motor armature 11 is connected by a conductor 13 with the generator armature 1 and through the generator commutating field and generator series field with the motor commutating field 12. The motor has a separately excited shunt field 14 which is provided with a variable resistor 15 controlled by a switch 16. The motor separately excited shunt field is connected in the main exciter circuit 7. The motor also has an auxiliary shunt field 17 which is connected in multiple with the motor circuit, that is, across the motor armature and the motor commutating field, the connection being controlled by a reversing switch 18. The arrangement of the auxiliary shunt field is such that the flux developed by the generator voltage therein is opposed to the flux developed by the motor separately excited shunt field. An auxiliary exciter 19 is also connected with the motor auxiliary shunt field and has a separately excited field 20 connected with the main exciter circuit and provided with a variable resistor 21 controlled by a switch 22. The voltage of the auxiliary exciter is opposed to the armature voltage in the auxiliary shunt field so that the effective strength of this auxiliary shunt field would be governed by the difference between the armature voltage and the exciter voltage.

When the motor is lightly loaded and the generator voltage is high the effective voltage in the differentially excited auxiliary shunt field 17 will be the difference between the generator and the auxiliary exciter voltage and the generator voltage being the greater the auxiliary shunt field voltage will be in the direction of the generator potential and the flux created thereby will be opposed to the flux created by the separately excited shunt field 14 of the motor, thereby reducing the effective field strength of the motor and allowing the motor to operate at maximum speed. When the motor is operating under heavy load and the generator voltage is correspondingly low the auxiliary exciter voltage will exceed the generator voltage and the direction of the effective voltage of the auxiliary shunt field will be that of the exciter voltage. Consequently the effective flux of the auxiliary shunt field will be cumulative to that of the separately excited shunt field 14 of the motor, thereby strengthening the effective motor field and allowing the motor to develop its maximum torque.

Preferably means, such as a drum controller 23, as shown in Fig. 2, is provided for operating the several switches and is of such a character that these switches may be operated simultaneously in either direction and when the controller is thrown in either direction it will simultaneously energize the generator separately excited shunt field in the desired direction, strengthen the separately excited shunt motor field and the separately excited shunt field of the auxiliary exciter for the motor and will connect the motor auxiliary shunt field in the desired direction. The organization shown in Fig. 2, and the operation thereof, are the same as in Fig. 1, with the exception that the circuits have been rearranged to permit the switches, 8, 16, 18 and 22, to be embodied in the controller 23.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In an electrical power unit, the combination with a differentially wound generator having a high no load voltage which is reduced as the current increases, of a motor having an armature and a commutating field connected in series with said generator and having a separately excited shunt field, an auxiliary shunt field connected in multiple with said motor armature, the flux created by the generator voltage in said auxiliary shunt field being opposed to the flux created by said separately excited shunt field, and means for impressing upon said auxiliary shunt field a voltage opposed to said generator voltage.

2. In an electrical power unit, the combination with a differentially wound generator having a high no load voltage which is reduced as the current increases, of a motor having an armature and a commutating field connected in series with said generator and having a separately excited shunt field, an auxiliary shunt field connected in multiple with said motor armature, the flux created by the generator voltage in said auxiliary shunt field being opposed to the flux created by said separately excited shunt field, and an auxiliary exciter connected with said auxiliary shunt field, the voltage of said auxiliary exciter being opposed to the generator voltage in said auxiliary shunt field.

3. In an electrical power unit, the combination with a differentially wound generator having a high no load voltage which is reduced as the current increases, of a motor in circuit with said generator and comprising a main separately excited shunt field, an exciter for said shunt field, an auxiliary shunt field connected across the armature of said motor, an exciter for said auxiliary shunt field, the exciter voltage in said auxiliary shunt field being opposed to the generator voltage, and the flux created by the generator voltage in said auxiliary shunt field being opposed to the flux of said main shunt field.

4. In an electrical power unit, the combination with a differential generator comprising an armature, a commutating field, a series field, a self-excited shunt field and a separately excited shunt field, a main exciter circuit connected with said separately excited shunt field, and an exciter for said exciter circuit, of a motor comprising an armature, a commutating field, a separately excited shunt field connected with said main exciter circuit and an auxiliary shunt field connected in multiple with said motor armature and opposed to said motor separately excited shunt field and an auxiliary exciter connected with said auxiliary shunt field and comprising an exciter field connected with said main exciter circuit, the voltage of said auxiliary exciter being opposed to the generator voltage in said auxiliary shunt field.

5. In an electrical power unit, the combination with a differential generator comprising an armature, a commutating field, a series field, a self-excited shunt field and a separately excited shunt field, a main exciter circuit connected with said separately excited shunt field, and an exciter for said exciter circuit, of a motor comprising an armature, a commutating field, a separately excited shunt field connected with said main exciter circuit, and an auxiliary shunt field connected in multiple with said motor armature and opposed to said motor separately excited shunt field, and an auxiliary exciter connected with said auxiliary shunt field and comprising an exciter field connected with said main exciter circuit, the voltage of said auxiliary exciter being opposed to the generator voltage in said auxiliary shunt field, and a controller for controlling the flow of current through the separately excited shunt fields of said generator and said motor and through the field of said auxiliary exciter and for controlling the connections between said auxiliary shunt field and the armature circuit of said motor.

In testimony whereof, I affix my signature hereto.

WALTER W. JOHNSON.